United States Patent
Heijnsdijk et al.

(10) Patent No.: US 7,261,001 B2
(45) Date of Patent: Aug. 28, 2007

(54) MAGNETOINDUCTIVE FLOWMETER AND METHOD FOR PRODUCING A MAGNETOINDUCTIVE FLOWMETER

(75) Inventors: Alexander Mamix Heijnsdijk, Papendrecht (NL); Arnoud Leendert van Willigen, Capelle aan den Ijssel (NL); Graham Roderick Lodge, Cambs (GB); Paul Anthony Johnson, Cherry Hinton (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/292,582

(22) Filed: Dec. 1, 2005

(65) Prior Publication Data
US 2006/0144161 A1    Jul. 6, 2006

(30) Foreign Application Priority Data
Dec. 2, 2004 (DE) ............... 10 2004 058 294
Dec. 27, 2004 (DE) ............... 10 2004 063 617

(51) Int. Cl.
*G01F 1/58* (2006.01)
(52) U.S. Cl. ................................. 73/861.12
(58) Field of Classification Search ............ 73/861.11, 73/861.12, 861.14
See application file for complete search history.

(56) References Cited

U.S. PATENT DOCUMENTS

| | | | |
|---|---|---|---|
| 5,280,727 A | | 1/1994 | Hafner et al. |
| 5,307,687 A | | 5/1994 | Arai et al. |
| 5,337,607 A | * | 8/1994 | Brown ............... 73/861.12 |
| 5,503,026 A | | 4/1996 | Böhm et al. |
| 5,544,532 A | * | 8/1996 | Brown ............... 73/861.12 |
| 5,625,155 A | * | 4/1997 | Yoshida ............. 73/861.12 |
| 6,802,223 B2 | * | 10/2004 | Nakatani et al. ...... 73/861.12 |

FOREIGN PATENT DOCUMENTS

| | | |
|---|---|---|
| DE | 4243077 | 6/1993 |
| EP | 0555493 A1 | 8/1993 |
| EP | 0608739 | 8/1994 |
| EP | 1431716 A1 | 6/2004 |

OTHER PUBLICATIONS

European Search Report, European Patent Office, May 8, 2006.

* cited by examiner

*Primary Examiner*—Harshad Patel
(74) *Attorney, Agent, or Firm*—Cesari & McKenna, LLP

(57) ABSTRACT

A magnetoinductive flowmeter includes a measuring tube, a magnetic field device serving to generate and guide a magnetic field at least part of which permeates the measuring tube, and two electrodes for collecting a voltage induced in a medium as it flows through the measuring tube. The electrodes are so positioned, without connection to the magnetic field device, that their longitudinal axes extend at an angle diverging from zero relative to the direction of the voltage induction. In this uncomplicated fashion, a large effective electrode surface is made available for collecting the voltage induced in the medium. A method for producing the flowmeter is also described.

7 Claims, 3 Drawing Sheets

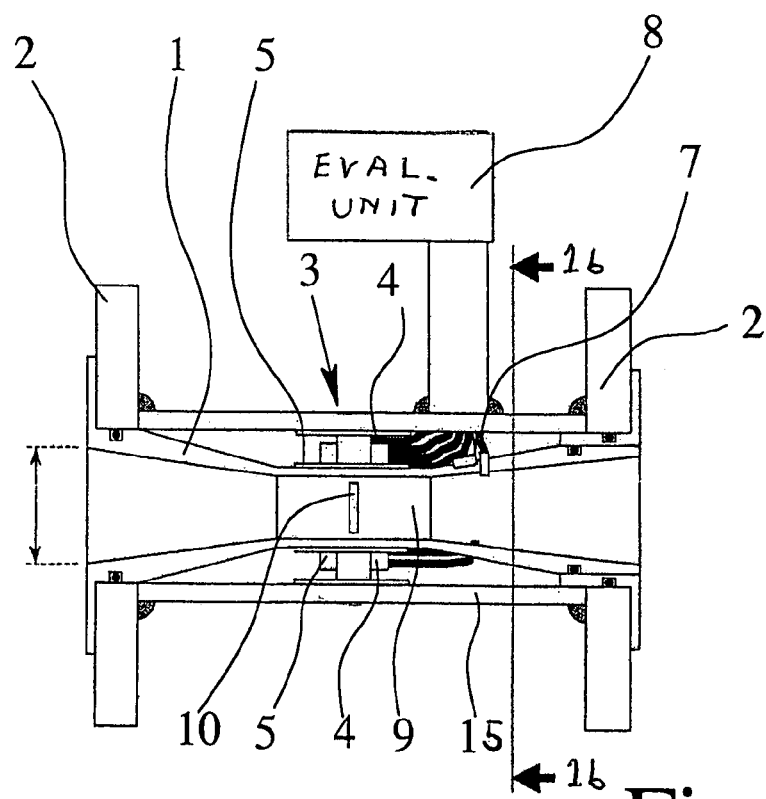
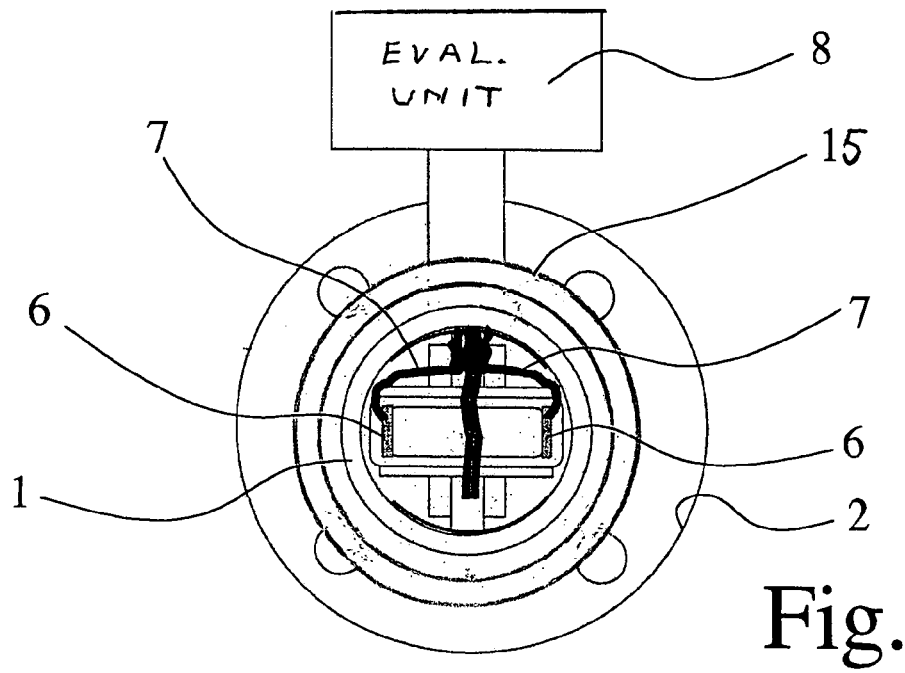

MAGNETOINDUCTIVE FLOWMETER AND METHOD FOR PRODUCING A MAGNETOINDUCTIVE FLOWMETER

BACKGROUND OF THE INVENTION

Field of the Invention

This invention relates to a magnetoinductive flowmeter encompassing a measuring tube, a magnetic-field device serving to generate and guide a magnetic field at least part of which permeates the measuring tube, and two electrodes serving to collect the voltage induced in a medium flowing through the measuring tube. The invention further relates to a method for producing a magnetoinductive flowmeter that encompasses a measuring tube and two electrodes serving to collect the voltage induced in a medium flowing through the measuring tube.

Magnetoinductive flowmeters and methods for producing magnetoinductive flowmeters are well-known from the prior art, an example of which is "K. W. Bonfig, Technische Durchflussmessung (techno-industrial flow measuring), $3^{rd}$ edition, Vulkan Verlag Essen, 2002, pp. 123-167". The fundamental principle of a magnetoinductive flowmeter for determining the flow of a medium goes all the way back to Faraday who in 1832 proposed employing the principle of electrodynamic induction for flow-rate measurements. According to Faraday's law of induction, a flowing medium that contains charge carriers and travels through a magnetic field will generate an electric field intensity perpendicular to the flow direction and to the magnetic field. A magnetoinductive flowmeter utilizes Faraday's law of induction in that a magnetic field device, containing at least one magnet with typically two field coils, generates a magnetic field and directs it through the cross-sectional lumen of the measuring tube, said magnetic field having a magnetic-field component that extends in a direction perpendicular to the direction of flow. Within this magnetic field, each volume element of the medium flowing through the magnetic field and containing a certain number of charge carriers contributes via the field intensity generated in the volume element, to a measuring voltage that can be tapped via the electrodes. A salient feature of magnetoinductive flowmeters is the proportionality that exists between the measured voltage and the flow velocity of the medium, averaged across the diameter of the measuring tube, i.e. between the measured voltage and the volume of flux.

SUMMARY OF THE INVENTION

It is the objective of this invention to introduce a magnetoinductive flowmeter, and a method for producing a magnetoinductive flowmeter, by means of which the voltage induced in the flowing medium can be collected both efficiently and in a simple fashion.

In a magnetoinductive flowmeter as described above, this objective is achieved by positioning the electrodes, without any connection to the magnetic field device, in a manner whereby their longitudinal axes extend at an angle diverging from zero relative to the direction of voltage induction.

The fundamental concept of the invention thus lies in positioning the electrodes, serving to collect the voltage induced in the medium, in a manner distinctly different from a configuration whereby they would longitudinally extend parallel to the direction of voltage induction. As a result, the effective electrode surface for collecting the induced voltage is not primarily the end face, for instance of a pin-type electrode but its lateral surface and thus a significantly larger effective electrode surface for collecting the induced voltage.

Specifically, in one preferred embodiment of the invention, the longitudinal axis of the electrodes extends in a direction perpendicular to the direction of voltage induction, or at least it does not diverge substantially from such perpendicular orientation, with the angle between the two directions being, for instance, somewhere between 75° and 90°.

A preferred embodiment of the invention additionally provides for the inner wall of the measuring tube to consist of a dielectric material or, preferably, for the entire measuring tube to consist of a dielectric material. Alternatively, in a preferred embodiment, the inner wall of the measuring tube is coated with a dielectric layer. In a preferred embodiment of the invention, the dielectric inner wall or layer of the measuring tube is provided with a matching socket for each of the two electrodes which are pressfit-mounted in their respective sockets and extend for wet contact with the flowing medium. The advantage of this configuration lies in the fact that no additional provisions or procedures are necessary for retaining the electrodes. Moreover, the mount can be self-sealing, obviating the need for any additional sealing provisions. As an alternative to this preferred embodiment of the invention, various other mounting and sealing processes are possible within the scope of the invention, including the installation of a retaining ring for securing each of the electrodes and of an O-ring gasket for sealing each of the electrodes, or gluing the electrodes into the layer on the inner wall of the measuring tube and providing the electrodes with a catch and/or a thread so as to securely hold them in that layer.

In general, the electrodes may be of any cross-sectional shape, for instance rectangular or square, preferably with rounded edges. Correspondingly, the electrodes in a preferred embodiment of the invention are essentially pin-shaped. Additionally, in a preferred embodiment of the invention, at least some segments of the electrodes feature a circular or oval cross section. In this connection, it should be noted that a round cross section is easy to produce while, on the other hand, a noncircular cross section provides the electrodes with a torsion lock. According to one preferred embodiment of the invention, the electrodes may even be plate-shaped, meaning a cross section that is rectangular in the plane extending in the direction perpendicular to the longitudinal axis of the electrodes while the lateral length of the rectangle is substantially greater in the direction of flow than in the perpendicular direction.

In a preferred embodiment of the invention, the cross-sectional shape of the electrodes varies along their longitudinal axis. As a specific example, the end sections of the electrodes may be essentially circular while the central region of the electrodes that is in wet contact with the medium flowing through the measuring tube is semicircular, with the flat side of the electrode facing the medium. This also reduces both the weight and the cost of the material.

The above-described electrodes of the magnetoinductive flowmeter are generally suitable for use in measuring tubes of any cross-sectional profile. However, a preferred embodiment of the invention provides for the segment of the measuring tube next to the electrodes to have a noncircular and, preferably, an essentially rectangular cross section, while the electrodes are mounted within the lateral walls of the measuring tube and extend over essentially the entire height of these lateral walls. Also, in one preferred embodiment of the invention, the lateral walls are constituted of the short sides of the rectangle. In this context, it should be noted that within the scope of this invention the term "essentially rectangular" is intended to include shapes that are not necessarily defined by straight lines but have corners of the "rectangle" that transition via concave or convex contours. The "corners", in turn, do not necessarily have to be true angular edges but may instead be curvilinear.

While it is entirely possible to use uncoated electrodes, a preferred embodiment of the invention provides for the electrodes to be partly coated with an insulating layer. This permits precise definition of the electrode segment that is to be in wet contact with the medium flowing through the measuring tube. Also, for instance when an electrode touches a lateral wall of the measuring tube, this will prevent an uncontrolled accumulation of gas i.e. air, or of dirt between the electrode and the side wall, potentially increasing the noise level that could interfere with the measurement.

As an alternative, one preferred embodiment of the invention addresses that problem in that the electrodes are mounted in a way whereby their outer surfaces are more or less completely surrounded by the flowing medium. To that effect the electrodes are at least partly mounted at a distance from the lateral wall concerned.

Mounting the electrodes within the measuring tube can be accomplished in different ways. In one preferred embodiment of the invention, the wall of the measuring tube is provided with access openings through which the electrodes can be inserted and removed from the outside. This is an advantageous feature in that it is generally possible to replace the electrodes without having to remove the magnetoinductive flowmeter from the pipeline system in which it is installed for flow-measuring purposes. In a preferred embodiment of the invention, two externally accessible openings are provided for each electrode in the measuring tube, allowing both ends of each electrode to be positioned in a corresponding opening. This has the advantage that it is not necessary to tightly clamp or secure the electrodes in the measuring tube, since the medium in the measuring tube does not exert any pressure on the electrodes that might push them out of the opening. In another preferred embodiment of the invention, a similar effect can be achieved with only one externally accessible opening per electrode when the distal end of the inserted electrode opposite the access opening butts in firm, flush fashion against a wall of the measuring tube or engages in a matching recess in the wall of the measuring tube. Alternatively, the electrodes may be solidly embedded in the layer on the inner wall of the measuring tube.

In that connection, the objective of the above-described method for producing a magnetoinductive flowmeter is achieved in that the electrodes are mounted on the inner wall of the measuring tube before a dielectric layer is applied on that inner wall, whereupon the dielectric coating is applied in liquid form, embedding the electrodes and, once hardened, holding them in place. Of course, to permit electrically conductive contact with the medium flowing through the measuring tube, at least part of the electrodes must protrude from the dielectric layer.

There are numerous ways in which the magnetoinductive flowmeter according to the invention, and the novel method for producing such a magnetoinductive flowmeter, can be configured and further enhanced. In that context, attention is invited to the dependent claims and to the following detailed description of a preferred embodiment of the invention with reference to the attached drawings.

BRIEF DESCRIPTION OF THE DRAWINGS

The invention description below refers to the accompanying drawings, of which:

FIG. 1a is a schematic longitudinal sectional view of a magnetoinductive flowmeter according to a preferred embodiment of the invention;

FIG. 1b is a schematic cross-sectional view of the magnetoinductive flowmeter in FIG. 1a;

DETAILED DESCRIPTION OF AN ILLUSTRATIVE EMBODIMENT

Figure 2A:
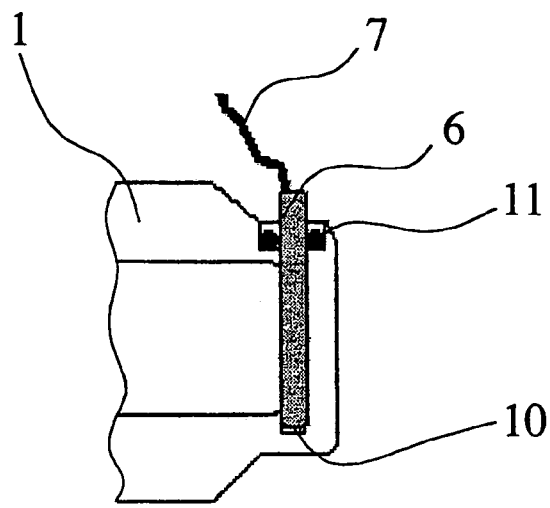
FIGS. 2a to 2c show different ways in which an electrode can be configured and installed in the FIG. 1a flowmeter.

FIGS. 1a and 1b depict a magnetoinductive flowmeter according to a preferred embodiment of the invention. The magnetoinductive flowmeter encompasses a measuring tube 1 each end of which is provided with a flange 2 for the installation of the magnetoinductive flowmeter in a pipeline system, not illustrated. It also incorporates a magnetic field device 3 comprising two field coils 4 and pole plates 5. The magnetic field device 3 serves to generate a magnetic field that permeates the measuring tube in a direction perpendicular to the direction of flow as determined by the longitudinal axis of the measuring tube 1.

The voltage induced in the medium flowing through the measuring tube 1 is collected by two mutually opposite electrodes 6 and is fed via lines 7 to an evaluation unit 8. While FIG. 1b shows the electrodes 6 proper, it can be seen from FIG. 1a that the inner wall of the measuring tube 1 in the area of the magnetic field is provided with a dielectric layer 9 featuring sockets 10 each of which accommodates one electrode 6. Mounted in these sockets 10 are the electrodes 6 which, in this example, are pin-shaped with a circular cross section and oriented in such fashion that in their longitudinal direction, they extend parallel to the magnetic field and perpendicular to the flow direction of the medium but also perpendicular to the direction of the voltage induced in the medium.

In this fashion, the entire lateral surface of an electrode 6 that is in wet contact with the medium flowing through the measuring tube 1 is effectively available for collecting the voltage induced in the medium. By comparison, in the case of this type of electrode when installed in a conventional magnetoinductive flowmeter equipped, for instance, with a round-tubular measuring tube in which the electrode may be radially inserted, only its end face is available for effectively collecting the voltage induced in the flowing medium. As can readily be seen, this invention makes it possible to utilize a relatively large electrode surface without requiring a correspondingly large opening in the wall of the measuring tube for introducing the electrode 6 from the outside. In this case, the size of the access opening for inserting the electrode 6 is determined by the diameter of its end face alone or by the largest diameter over the length of the electrode 6, while a lateral surface of the electrode 6 is available for collecting the induced voltage.

Figure 2B:
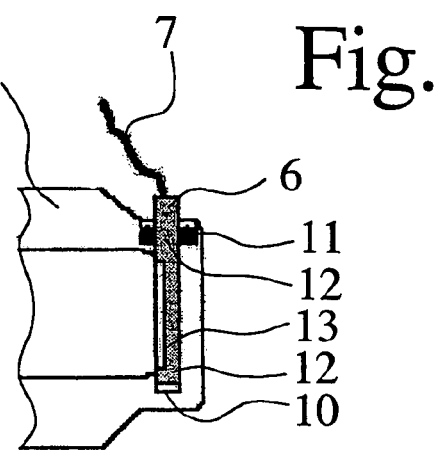
Figure 2C:
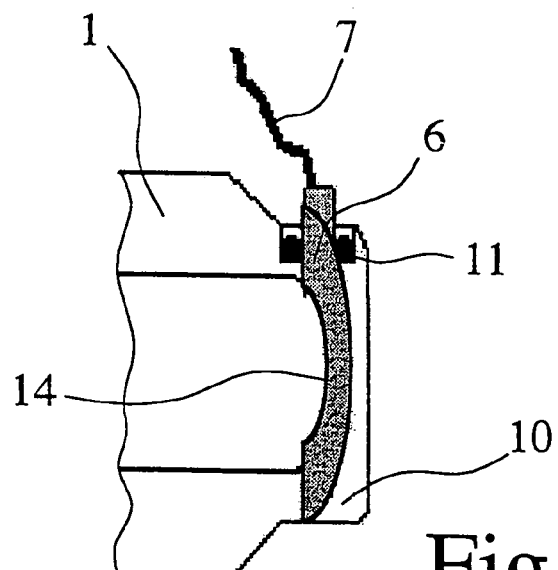

FIG. 2a to 2c as well make this particularly evident, showing various ways in which an electrode 6 can be shaped, inserted in the measuring tube 1 from the outside and mounted in the measuring tube 1 in leak-proof fashion. FIG. 2a again shows a pin-shaped electrode 6 with a cylindrical cross section, inserted from the top in an essentially rectangular measuring tube 1. Accordingly, the measuring tube 1 is provided with a socket 10 as discussed above, locking the electrode 6 in place. The interior of the measuring tube 1 is sealed from the outside by means of an O-ring gasket 11.

FIG. 2b shows a similar configuration, except that in this case, the electrode 6 is round only at its ends 12 while its central region 13, in wet contact with the flowing medium, has a semicircular cross section. As a general rule, varying the cross section of the electrode 6 along its axial length makes it possible to individually adapt its effective surface for collecting the voltage induced in the medium to the prevailing requirements.

Finally, FIG. 2c depicts an electrode 6 designed with a concave surface 14 facing the medium. This surface configuration may have its advantages for instance with a view to minimizing any disturbance of the flow profile of the medium traveling through the measuring tube 1.

Figure 3:
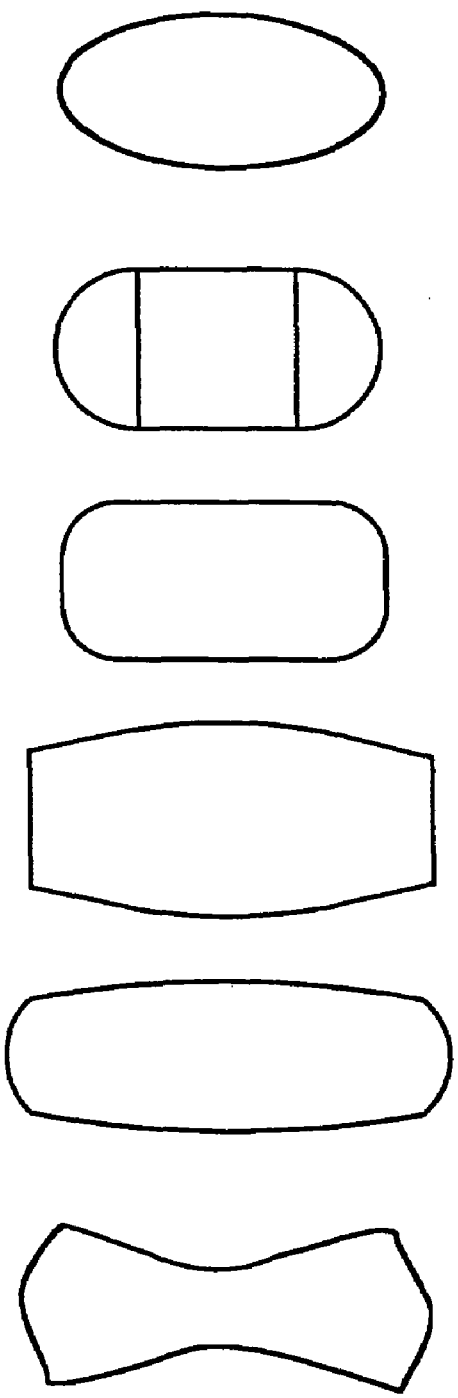
FIG. 3 is a schematic illustration of possible cross-sectional profiles of the measuring tube in the area in which the electrodes are installed in the FIG. 1a flowmeter.

As stated further above, the measuring tube 1 is essentially rectangular in the region in which it is permeated by the magnetic field. It has also been pointed out that, in this case, the term "rectangular" is used rather loosely in that it is intended to also include essentially oval shapes, contours with rounded corners and shapes with curvilinear edges. As examples only, FIG. 3 shows cross sectional profiles of the measuring tube 1 that are suitable for use in the area of the magnetic field. Preferably, as shown in FIG. 1a, the measuring tube 1 in the magnetoinductive flowmeter transitions from a cross section that is essentially cylindrical in the area of the flanges 2 to an essentially rectangular cross section of the measuring tube 1 in the area of the magnetic field as indicated for instance in FIG. 3. In other words, the cross section of the measuring tube 1 narrows significantly along the axis perpendicular to the direction of the voltage induction but rather minimally in the direction of voltage induction.

This shape of the measuring tube 1 may prove beneficial in that it is less conducive to the forming of deposits on the inner wall of the measuring tube 1. It also allows the two mutually opposite field coils 4 to be positioned closer together which, in turn, permits the generation of a more substantial magnetic field. At the same time, compared to a design without a narrowing of the tube cross section, the spacing between the electrodes 6 is not reduced by much so that a high degree of sensitivity can be maintained. Moreover, the essentially rectangular narrowing of the cross section helps smooth the flow pattern. Finally, another advantage of this design is that, as shown in FIGS. 1a and 1b, it leaves more space for the magnetic field device 3, allowing the measuring tube 1 and the magnetic field device 3 to be jointly accommodated in an external tube 15 whose inner diameter is only slightly larger than the outer diameter of the end sections of the measuring tube 1.

The invention claimed is:

1. A magnetoinductive flowmeter including a measuring tube, a magnetic field device serving to generate and direct a magnetic field at least part of which permeates the measuring tube, and two electrodes serving to collect a voltage potential induced in a medium flowing though the measuring tube, wherein the electrodes, unconnected to the magnetic field device, are so positioned that along their longitudinal axis they extend at an angle that diverges from zero relative to the direction of voltage induction;

the wall of the measuring tube is provided with externally accessible insertion openings for the electrodes through which the electrodes can be removed and inserted from outside the measuring tube, and for each electrode two externally accessible insertion openings are provided in the measuring tube in such fashion that both ends of each electrode are respectively seated in one of the two insertion openings.

2. The magnetoinductive flowmeter as in claim 1, wherein the angle between the direction in which the electrodes extend along their longitudinal axis and the direction of voltage induction is between 75° and 90°.

3. Magnetoinductive flowmeter as in claim 1 or 2, wherein the inner wall of the measuring tube is of a dielectric material or is coated with a dielectric layer, said dielectric inner wall or layer is provided with two sockets each of which accepts an electrode, and the electrodes, force-fitted for retention in the sockets, are so positioned in the sockets as to be in wet contact with the flowing medium.

4. The magnetoinductive flowmeter as in claim 1 or 2, wherein the electrodes are essentially plate- or pin-shaped.

5. The magnetoinductive flowmeter as in claim 1 or 2, wherein in the area of the electrodes, the measuring tube has an essentially rectangular cross section, the electrodes are mounted in the lateral wall section of the measuring tube, and the electrodes extend over essentially the full height of the lateral walls.

6. The magnetoinductive flowmeter as in claim 1 or 2, wherein the electrodes are partly coated with an insulating material.

7. The magnetoinductive flowmeter as in claim 1 or 2, wherein essentially the entire lateral outer surfaces of the electrodes are wetted by the flowing medium.

* * * * *